Dec. 30, 1969     A. J. RODRIGUEZ     3,486,691
FERTILITY CYCLE INDICATOR
Filed Nov. 28, 1967     3 Sheets-Sheet 1
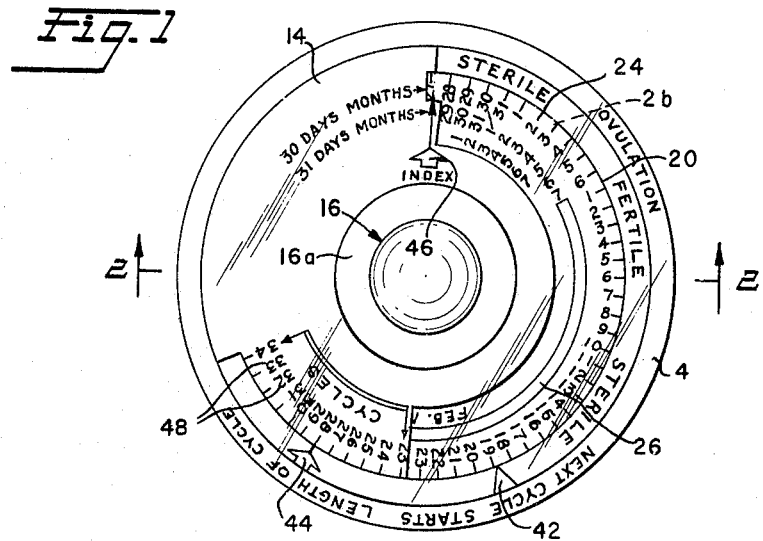
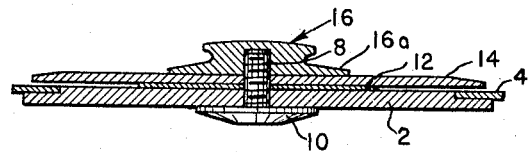
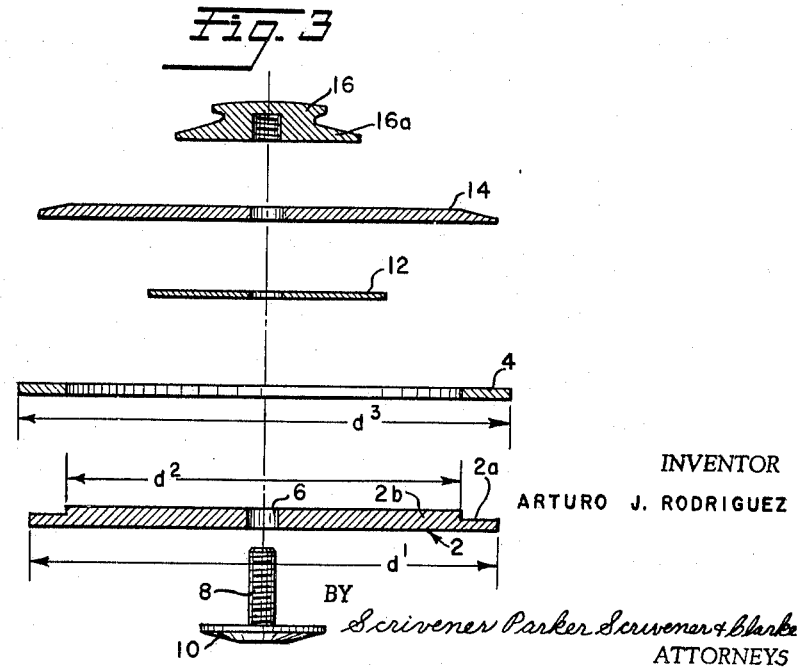
INVENTOR
ARTURO J. RODRIGUEZ
BY Scrivener Parker Scrivener & Clarke
ATTORNEYS Dec. 30, 1969　　　　　A. J. RODRIGUEZ　　　　　3,486,691
FERTILITY CYCLE INDICATOR
Filed Nov. 28, 1967　　　　　　　　　　　　　3 Sheets-Sheet 2

INVENTOR
ARTURO J. RODRIGUEZ

BY
*Scrivener Parker Scrivener & Clarke*
ATTORNEYS

United States Patent Office 3,486,691
Patented Dec. 30, 1969

3,486,691
FERTILITY CYCLE INDICATOR
Arturo J. Rodriguez, Calle Eddie Gracia 512,
Hato Rey, Puerto Rico 00918
Filed Nov. 28, 1967, Ser. No. 686,183
Int. Cl. G06c *3/00*
U.S. Cl. 235—88                           4 Claims

ABSTRACT OF THE DISCLOSURE

A fertility cycle indicator of the circular scale type, characterized by the provision of locking knob for clamping a window-bearing indicator disk to the smaller central portion of a stepped cylindrical input disk, an annular cycle ring being mounted for free rotation upon said central portion. By clamping together the base or input and indicator disks at a fixed position corresponding with the day of the month upon which menstruation began, the cycle ring may be adjusted in accordance with cycle length to directly indicate the sterile and fertile periods of that calendar period.

---

Many types of fertility cycle indicator devices have been proposed in the patented prior art, as evidenced by the U.S. patents to Thalmann No. 2,727,686, Mansur No. 2,118,354 and Klein No. 3,278,118. The present invention was developed to provide an improved more readily usable fertility cycle indicator device that is not only of simple inexpensive construction but also is extremely accurate and fool-proof in use.

The primary object of the present invention is to provide a fertility cycle indicating device including a stepped cylindrical base or input disk, an indicator disk coaxially arranged relative to the smaller stepped portion of said input disk, and means for fixedly clamping together the disks in a position corresponding to the calender day upon which menstruation last began. Mounted between said disks for free rotation upon said smaller stepped portion is an annular cycle ring that is settable in accordance with customary cycle length to indicate the calender days of the normal fertility period.

According to a more specific object of the invention, the clamping means comprises a locking knob threaded upon the rod about which the indicator disk rotates, said knob having at its lower end a circular flange portion having a planar lower surface adapted to engage the indicator disk. A compressible spacer disk is positioned between the input and indicator disks, and upon tightening of the knob, serves to lock together the said input and indicator disks.

Other objects and advantages of the invention will become apparent from a study of the following specification, when considered in conjunction with the accompanying drawing, in which:

FIG. 1 is a top plan view of the fertility cycle indicator;

FIG. 2 is a sectional view taken along line 2—2 of FIG. 1;

FIG. 3 is an exploded sectional view similar to FIG. 2;

Figure 4:
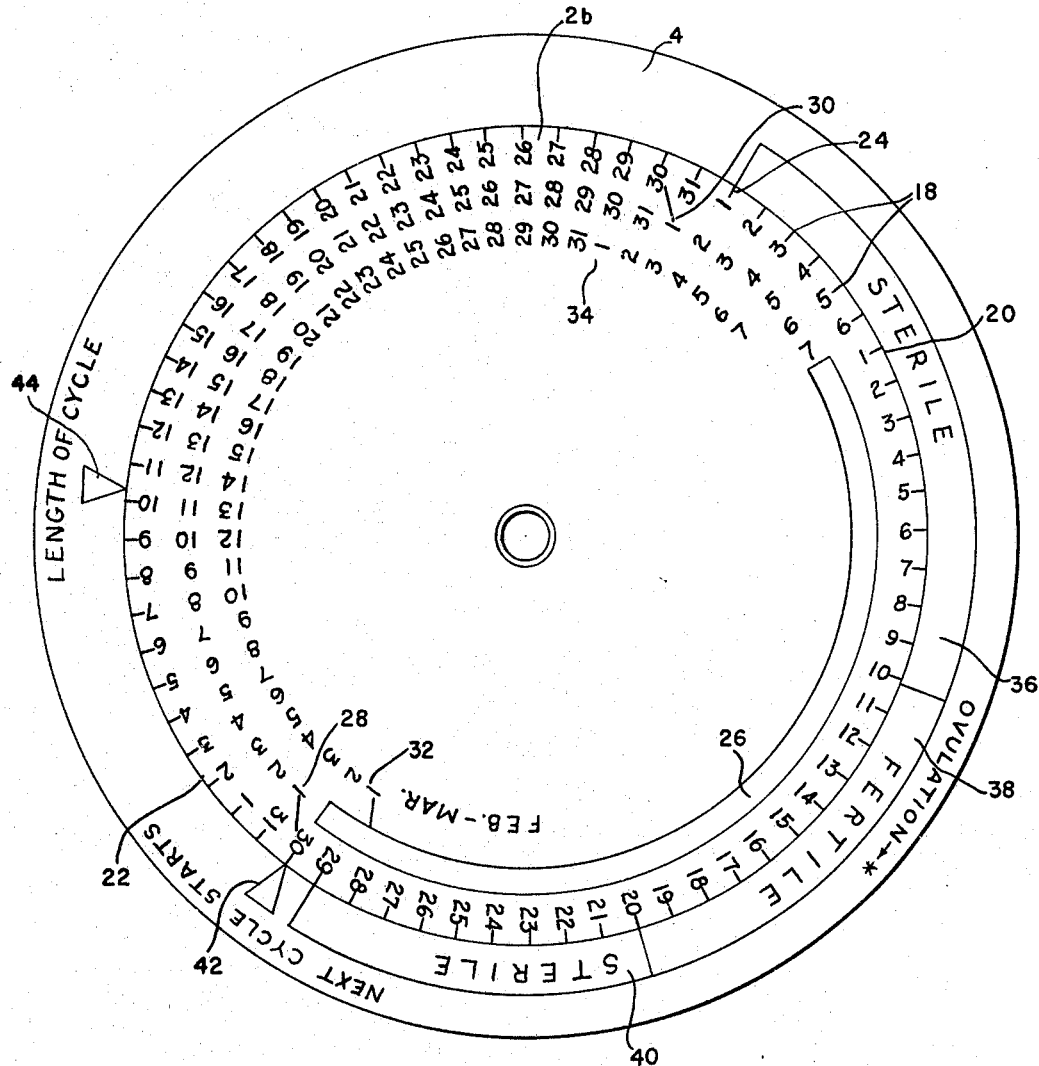
FIG. 4 is a top plan view of the input disk with the cycle ring mounted therein.

Referring first to FIGS. 1–3, the fertility indicating apparatus includes a vertically arranged stepped cylindrical base or input disk 2 having a lower portion 2a of a given first outer diameter $d^1$, and a coaxially arranged upper portion 2b having a smaller second outer diameter $d^2$. Rotatably mounted concentrically upon the upper portion 2b is an annular cycle disk 4 having an outer third diameter $d^3$ that is slightly greater than the outer first diameter $d^1$ of the input disk lower portion.

Extending coaxially upwardly through a corresponding bore 6 in the input disk 2 is a threaded rod 8 having an enlarged lower portion 10. Mounted on the rod is a spacer disk 12 formed of a compressible material such as felt, said spacer disk having an outer diameter that is less than the outer second diameter $d^2$ of the upper portion. As shown in FIG. 2, the thickness of the cycle ring is less than the sum of the thicknesses of the central portion 2a and the spacer disk 12.

Rotatably mounted on said rod above the spacer disk 12 is an indicator disk 14 the outer diameter of which is less than the outer diameter $d^3$ of the cycle ring. Finally, there is threadably mounted on the upper extremity of the rod 8 a locking knob 16 having a circular flange portion 16a with a planar lower surface adapted for engagement with the upper surface of the central portion of the indicator disk. The outer diameter of the flange portion is less than that of the spacer disk.

Referring now to FIG. 4, the upper portion 2b of the input disk is divided adjacent its periphery into sixty-eight equal graduations 18, defining a pair of successive thirty-one day month scales 20, 22, and a six day scale 24, respectively. The first thirty-one day scale is identified by an arcuate bar 26 having a characteristic color, such as yellow, that extends beneath the numerals "1" and "30," as shown. The arcuate bar is followed, in succession, by a middle or third thirty-one day month scale 28, and by a seven day scale 30. Commencing beneath the numeral "29" on the first scale 20 is an inner fourth thirty-one day scale 32 that is followed by a seven day scale 34.

The cycle ring 4 carries STERILE-FERTILE-STERILE portions 36, 38 and 40, respectively, the FERTILE portion extending a distance equal to ten of the graduations. Spaced from the end of the FERTILE portion by a ten graduation space is a NEXT CYCLE STARTS indicia 42, and spaced by a twenty-two graduation space is a length of cycle index 44. The STERILE portions 36 and 40 extend distances equal to sixteen and nine graduations, respectively.

Figure 5:
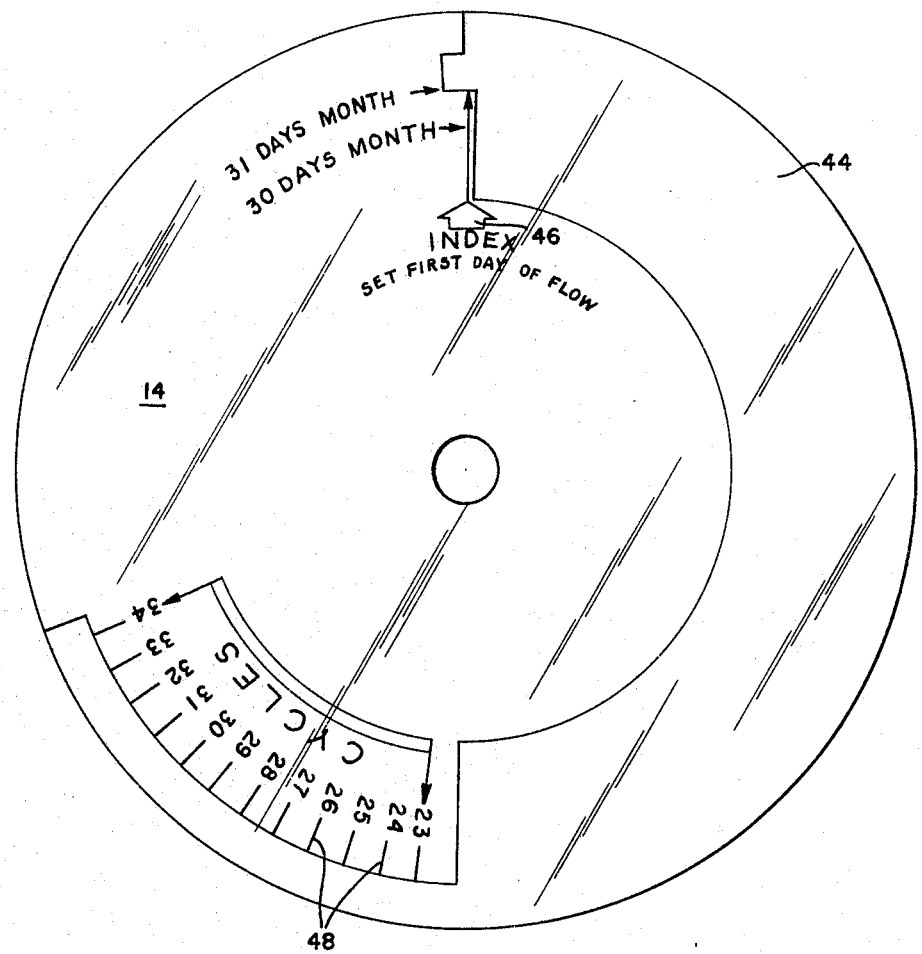
FIG. 5 is a top plan view of the indicator disk.

Referring finally to FIG. 5, the indicator disk 14 includes a transparent window portion 44 having an arcuate extent of about thirty-five graduations. Adjacent the left hand edge of the window is a setting index 46, and following a space of thirty-five graduations is a cycle length scale of twelve graduations 48 bearing the numerals "23" through "34."

OPERATION

Assume that for a given user having a regular menstrual period of 28 days, the first day of menstruation occured on May 1. With the locking knob released, indicator 14 is rotated relative to input disk 2 until the index 46 is opposite the numeral "1" on the first scale 20 identified by the bar 26. Locking knob 16 is then tightened to lock together the disks 14 and 2 with the felt spacer disk 12 compressed therebetween. The cycle ring 4 is now rotated until the length of cycle index 44 is opposite the numeral "28" on length-of-cycle scale 48, whereupon the fertile portion 38 of scale 4 is opposite numerals "9" through "19" on scale 20, the sterile period 36 is opposite numerals "1" through "9," sterile period 40 is opposite numerals "19" through "28," and the "next cycle starts" index is opposite the numeral "29." The user is thus advised at a glance of the important calendar days of the menstrual month.

Consider now the case wherein menstruation first occured on the 21st day of November, a thirty-day month. Index 46 is set opposite the numeral "21" on scale 20 (as indicated by the colored bar 26), and index 44 on scale 4 is set opposite numeral "28" on length of cycle scale 48. The fertile period extends now between numeral "29" on scale 20 and numeral "9" on middle scale 28 (since a thirty-day month is involved). Sterile period 36 is opposite numerals "21" through "29" on scale 20, and sterile period 40 is opposite numerals "9" through "18" on middle scale 28.

In the case of a twenty-eight day February, the outer scale 20 is again used for setting the indicator disk and scale 48 for setting the cycle ring, the only difference being that inner scale 32 is used for read-out rather than middle scale 28 or the second outer scale 22.

It is apparent that for operating the fertility cycle indicator, the only three steps required are to set the indicator disk 14 relative to the input disk 2, to lock the knob 16, and to set the cycle ring 4.

While in accordance with the provisions of the patent statutes, I have ilustrated and described the preferred form and embodiment of the invention, it will be apparent to those skilled in the art that various changes and modifications may be made in the apparatus described without deviating from the invention.

What is claimed is:

1. A fertility cycle indicator, comprising:
 a stepped cylindrical base disk; said disk having a lower base portion of a given first diameter, and a coaxially arranged upper portion of a smaller second diameter, said upper portion carrying adjacent its peripheral edge portion a plurality of graduations defining a pair of successive circumferentially extending day-of-the-month scales;
 an annular cycle ring rotatably mounted concentrically on the upper portion of said base disk, said cycle ring having an outer third diameter greater than said base disk first diameter, said cycle ring carrying a circumferentially extending fertile-sterile scale;
 a rod extending coaxially upwardly through said cylindrical disk central portion;
 a circular indicator disk rotatably mounted on said rod, said indicator disk having an outer diameter less than said third diameter and containing a transparent peripheral window portion for exposing portions of said day-of-the-month scales on said base disk, said indicator disk carrying adjacent one edge of the window an index and adjacent the other edge of the window a circumferentially extending cycle length day scale;
 an annular spacer disk mounted coaxially on said rod and frictionally engaging the surfaces of said base disc and said indicator disk and having an outer diameter less than said second diameter, the sum of the thicknesses of said spacer disk and the upper portion of said base disk being greater than the thickness of said cycle ring; and
 means for clamping said indicator disk at a desired set position relative to said base disk, whereby when the indicator disk is clamped to said cylindrical disk with the index opposite a menstrual period commencement date, said cycle ring may be rotatably adjusted relative to said base and indicator disks.

2. A fertility cycle indicator as defined in claim 1 wherein said spacer disk is formed of a compressible material; and further wherein the upper portion of said rod is threaded and clamping means comprises a locking knob threadedly mounted on said rod, said lock unit being operable to compressibly secure together the central portions of said base and indicator disks on opposite sides of said spacer disk.

3. A fertility cycle indicator as defined in claim 2, wherein said locking knob includes at its lower end an enlarged circular flange portion having a planar lower surface, the outer diameter of said locking knob being slightly less than the outer diameter of said spacer disk.

4. A fertility cycle indicator as defined in claim 1, wherein said base disk carries sixty-eight equally spaced graduations defining, in succession, a pair of thirty-one day scales and a six day scale; wherein the window has an angular extent of at least $32/68$ of a circle; and further wherein said cycle ring carries fertility indicia extending angularly about $10/68$ of a circle and a length of cycle index displaced angularly from said fertility indicia by an angle of about $23/68$ of a circle.

References Cited

UNITED STATES PATENTS

| | | | |
|---|---|---|---|
| 1,495,805 | 5/1924 | Rooney | 235—84 |
| 2,725,195 | 11/1955 | Rueff | 235—88 |
| 2,792,177 | 5/1957 | Ker | 235—88 |
| 3,215,344 | 11/1965 | Joffe | 235—78 |
| 3,278,118 | 10/1966 | Klien | 235—88 |
| 3,279,696 | 10/1966 | Sherman | 235—88 |

FOREIGN PATENTS 1,109,974  10/1955  France.

RICHARD B. WILKINSON, Primary Examiner

S. A. WAL, Assistant Examiner

U.S. Cl. X.R.

116—133; 235—85